(12) United States Patent
Chew

(10) Patent No.: US 8,074,039 B2
(45) Date of Patent: Dec. 6, 2011

(54) REDUNDANT ARRAY OF INDEPENDENT DISKS-RELATED OPERATIONS

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 12/240,776

(22) Filed: Sep. 29, 2008

(65) Prior Publication Data

US 2010/0083039 A1 Apr. 1, 2010

(51) Int. Cl.
*G06F 12/16* (2006.01)

(52) U.S. Cl. ........ 711/163; 711/114; 711/161; 711/162; 714/800

(58) Field of Classification Search .......... 711/161, 711/162, 163, 114; 714/800
See application file for complete search history.

(56) References Cited

U.S. PATENT DOCUMENTS

| | | | |
|---|---|---|---|
| 7,165,154 B2 | 1/2007 | Coombs et al. | |
| 2004/0158711 A1 | 8/2004 | Zimmer | |
| 2005/0081048 A1 | 4/2005 | Komarla et al. | |
| 2006/0053308 A1 * | 3/2006 | Zimmerman | 713/193 |
| 2006/0195704 A1 | 8/2006 | Cochran et al. | |
| 2008/0092029 A1 | 4/2008 | Arakawa et al. | |
| 2008/0229118 A1 | 9/2008 | Kasako et al. | |

FOREIGN PATENT DOCUMENTS

WO 2010/036654 A2 4/2010

OTHER PUBLICATIONS

International Search Report and Written Opinion for PCT Patent Application No. PCT/US2009/057869, mailed on Apr. 26, 2010, 11 pages.
U.S. Appl. No. 12/032,554, "Security for Raid Systems," filed Feb. 15, 2008.
"Enova@SecureIDE RAID", http://www.enovatech.net/products/reference/secureide_raid.htm, retrieved on Oct. 3, 2008, 4 pages.
"Secure RAID Controller", rocstor, http://www.thinkcp.com/products/SecureRAIDController.asp, retrieved on Oct. 3, 2008, 2 pages.
"How to build a fully encrypted NAS on OpenBSC Search", Geek Technique, http://geektechnique.org/projectlab/796/how-to-build-a-fully-excrypted-nas-on-openbsd, retrieved on Oct. 3, 2008, 11 pages.
Office Action received for European Patent Application No. 09816761.2, mailed on May 11, 2011, 2 Pages.

* cited by examiner

*Primary Examiner* — Jae Yu
(74) *Attorney, Agent, or Firm* — Grossman, Tucker, Perreault & Pfleger, PLLC

(57) ABSTRACT

In an embodiment, an apparatus is provided that may include circuitry to generate, at least in part, and/or receive, at least in part, at least one access request involving a redundant array of independent disks (RAID) storage. The storage may be capable of accessing, in response, at least in part, to the at least one request an encryption and/or parity information. The encryption may be of at least one portion of the data and/or the parity information. The encryption may be stored in (1) encrypted disk stripes in the storage such that the data is unrecoverable based solely upon remaining unencrypted portion of the data and the parity information stored in the storage, and/or (2) one or more respective disk stripes having a number that is determined based at least in part upon one or more encryption levels, if any, associated with at least one characteristic of the data.

10 Claims, 3 Drawing Sheets

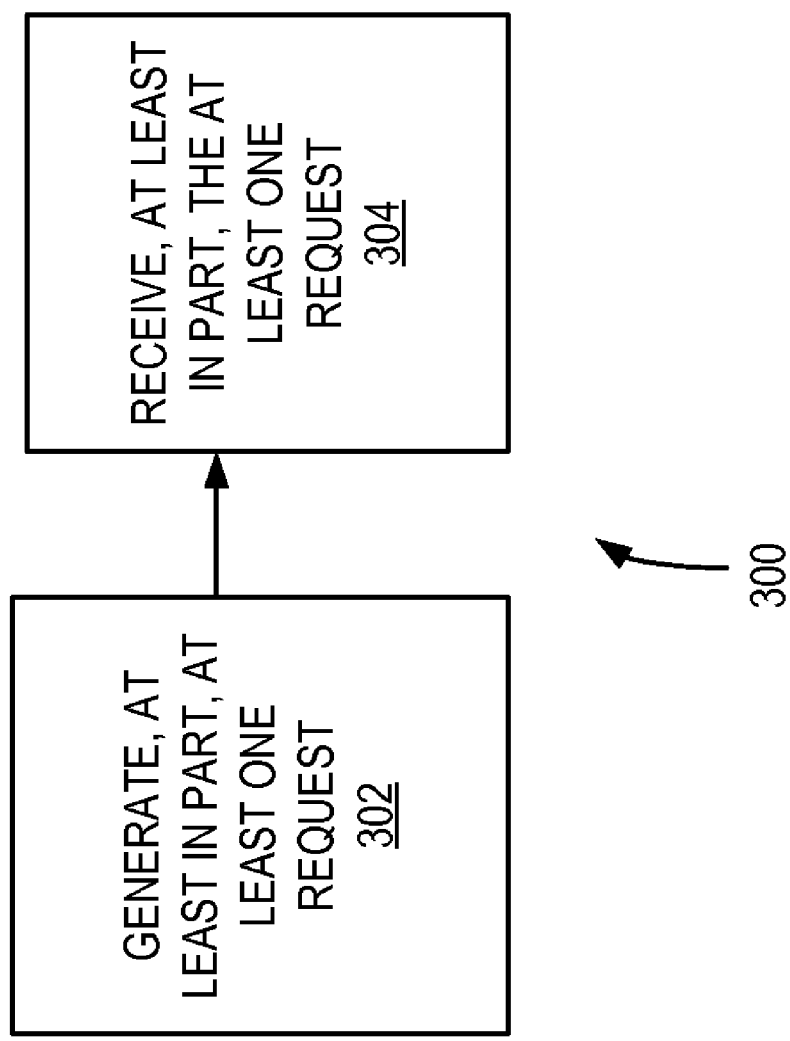

REDUNDANT ARRAY OF INDEPENDENT DISKS-RELATED OPERATIONS

FIELD

This disclosure relates to redundant array of independent disks (RAID)-related operations.

BACKGROUND

In one conventional RAID arrangement, a user data block and associated parity information are encrypted (using a uniform encryption scheme) and striped across all of the disks in the RAID. If a stripe of user data is modified, all of the other user data and parity stripes associated with the modified user data stripe are decrypted, and then used to calculate a new parity stripe to be associated with the modified user data stripe. This decryption of the other user data and parity stripes in the data writing process reduces the speed and efficiency of the data writing process.

Additionally, in this conventional arrangement, each disk in the RAID includes both user data stripes and parity information. Accordingly, conflict/contention issues may arise if two RAID operations are concurrently executed that involve accessing parity information and user data, respectively, in a single respective disk. This may reduce efficiency and performance of the RAID.

Also in this conventional arrangement, a single, uniform encryption scheme is used for all user data stored in the RAID, regardless of the particular nature, characteristics, sensitivity and/or importance of specific portions of that data. This reduces the utility of the RAID, and also prevents user selection of the balance to be struck between data security and RAID performance.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 3 illustrates operations that may be performed in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
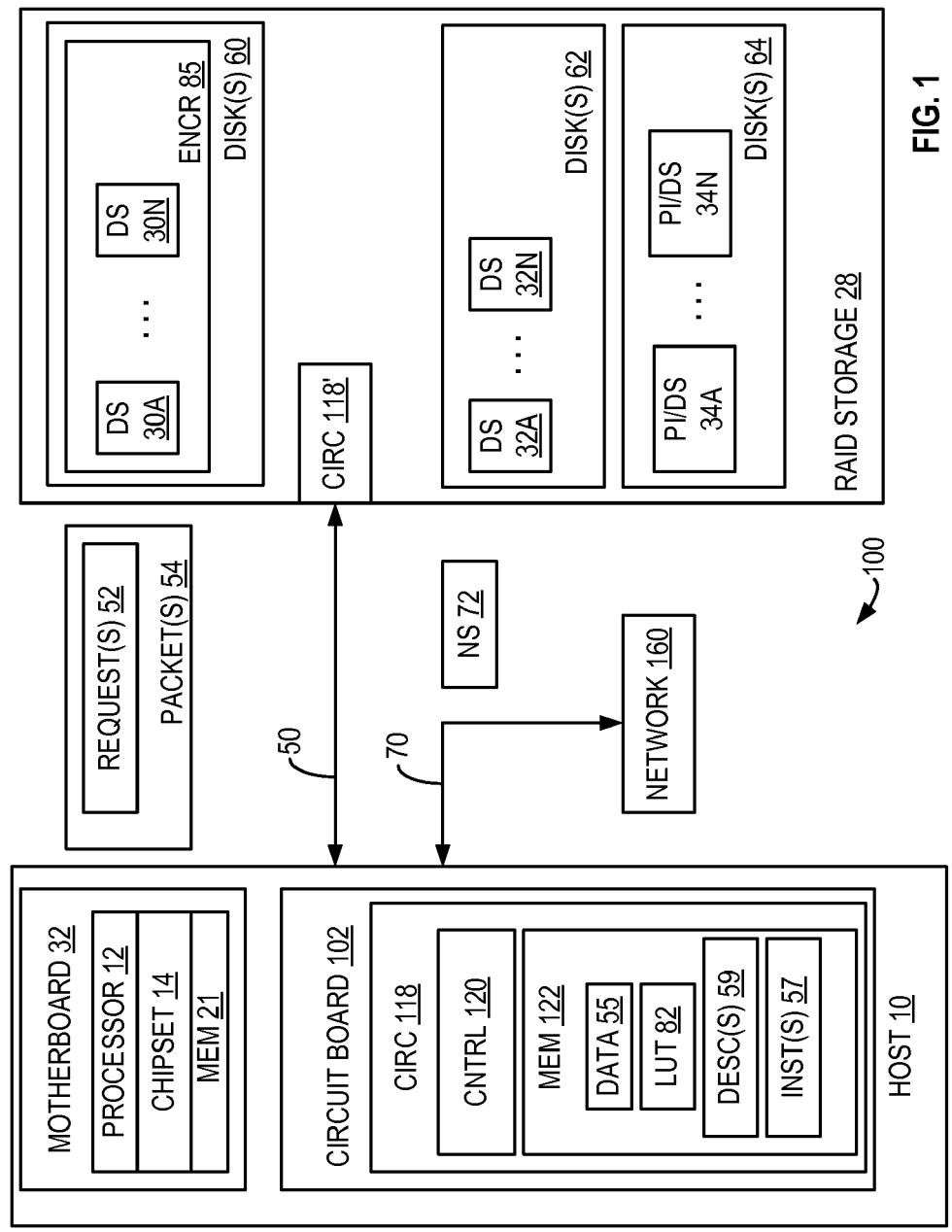
FIG. 1 illustrates features of an embodiment.

FIG. 1 illustrates a system embodiment 100. System 100 may include host 10 that may be communicatively coupled via one or more communication links 50 to RAID 28.

In this embodiment, as shown in FIG. 1, host 10 may comprise circuit board 102 and motherboard 32. Motherboard 32 may comprise one or more host processors 12. Each of the host processors 12 may be coupled (e.g., via a respective not shown segment of a proprietary bus) to a chipset 14. Each of the one or more host processors 12 may comprise, for example, a respective Intel® Core™ 2 VPro™ microprocessor that is commercially available from the Assignee of the subject application. As used herein, a "processor" means circuitry capable of performing, at least in part, one or more arithmetic and/or logical operations. Of course, alternatively, each of the host processors 12 may comprise, for example, a respective microprocessor that is manufactured and/or commercially available from a source other than the Assignee of the subject application, without departing from this embodiment.

Chipset 14 may comprise a not shown memory controller hub that may couple one or more host processors 12, a system memory 21 and a not shown user interface system to each other and to a not shown bus system. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. The not shown user interface system may comprise, e.g., a keyboard, pointing device, and display system that may permit a human user to input commands to, and monitor the operation of, system 100. The not shown bus system may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. Alternatively, the bus may comprise other types of bus systems, without departing from this embodiment.

Controller circuit card 102 in host 10 may be communicatively coupled to RAID storage 28 via links 50, and may control the operation of storage 28. In this embodiment, RAID storage 28 may comprise a plurality of mass storage disks 60, 62, and/or 64. The RAID level that may be implemented in RAID storage 28 may vary without departing from embodiments described herein. Depending upon, for example, the RAID level implemented in RAID storage 28, the number of mass storage disks comprised in disks 60, 62, and/or 64 may vary so as to permit the number of such disks to be at least sufficient to implement the RAID level so implemented in RAID storage 28.

As used herein, "storage" may mean one or more apparatus into, and/or from which, data may be stored and/or retrieved, respectively. Also as used in herein, the terms "mass storage" and "mass storage device" may be used interchangeably to mean storage capable of non-volatile storage of data. Additionally herein, the terms "disk," "mass storage disk" and "mass storage disk device" may be used interchangeably to mean mass storage that comprises one or more disks and/or one or more platters, and/or one or more surfaces to and/or on which data may stored and/or from which data may be retrieved. For example, in embodiments described herein, a mass storage disk may include, without limitation, one or more non-volatile magnetic and/or optical disk storage devices, such as, one or more hard disk devices. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

Controller circuit card 102 may comprise operative circuitry 118. Operative circuitry 118 may comprise storage I/O controller 120 and memory 122.

Processors 12, system memory 21, and chipset 14 may be comprised in a single circuit board, such as, for example, system motherboard 32. Motherboard 32 also may comprise the not shown bus system and a not shown bus card slot. Card 102 may include a not shown bus connector that may be capable of being electrically and mechanically coupled to the bus card slot that may be comprised in the motherboard 32. When the bus connector of card 102 is so coupled to the bus card slot comprised in motherboard 32, operative circuitry 118 may become communicatively coupled to mother board 32.

Alternatively, some or all of the operative circuitry 118 of controller card 102 may not be comprised in card 102, but instead, may be comprised in other structures, systems, and/or devices. These other structures, systems, and/or devices may be, for example, comprised in motherboard 32 (e.g., as part of host processor 12 and/or chipset 14). Alternatively or additionally, some or all of the circuitry comprised in host processor 12, chipset 14, and/or circuitry 118 may be comprised in one or more integrated circuits (not shown) that may be comprised in, for example, one or more (not shown) integrated circuit chips.

One or more machine-readable program instructions may be stored in computer-readable memory 122 and/or 21. In operation of system 100, these instructions may be accessed and executed by controller 120 and/or one or more host processors 12. When executed by controller 120 and/or one or more host processors 12, these one or more instructions may result in controller 120, operative circuitry 118, host processor 12, and/or card 102 performing the operations described herein as being performed by controller 120, operative circuitry 118, host processor 12, and/or card 102. Also when executed by controller 120 and/or one or more host processors 12, these one or more instructions may result in data 55, one or more RAID instructions 57, one or more RAID descriptors 59, data 55, and/or one or more look up tables (LUT) 82 being stored in memory 122. Alternatively or additionally, data 55, one or more instructions 57, one or more descriptors 59, and/or one or more LUT 82 may stored, in whole or in part, in memory 21. Computer-readable memory 21 and 122 may each comprise one or more of the following types of memories: semiconductor firmware memory, programmable memory, non-volatile memory, read only memory, electrically programmable memory, random access memory, static random access memory, flash memory, magnetic disk memory, optical disk memory, and/or other or later-developed computer-readable memory.

RAID 28 may comprise operative circuitry 118' whose construction may conform, in whole or in part, the construction of circuitry 118. Circuitry 118' may be communicatively coupled via one or more links 50 to circuit board 102 and circuitry 118. One or more machine-readable program instructions may be stored in computer-readable memory (not shown) in circuitry 118'. In operation of system 100, these instructions may be accessed and executed by a not shown controller in circuitry 118'. When executed by this not shown controller in circuitry 118', these one or more instructions may result in this not shown controller 120 and/or operative circuitry 118' performing the operations described herein as being performed by this not shown controller and/or operative circuitry 118'.

One or more communication links 50 may be compatible with one or more communication protocols, and circuitry 118 in host 10 may exchange data and/or commands with circuitry 118' in RAID 28 via links 50, in accordance with these one or more communication protocols. For example, in this embodiment, one or more links 50 may be compatible with, and the respective operative circuitry 118 may exchange data and/or commands with RAID 28 in accordance with, e.g., an Ethernet protocol, Transmission Control Protocol/Internet Protocol (TCP/IP) protocol, Small Computer Systems Interface (SCSI) protocol, and/or Internet Small Computer Systems Interface (iSCSI) protocol.

The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. The SCSI protocol that may be utilized in system 100 may be compatible with the protocol described in American National Standards Institute (ANSI) Small Computer Systems Interface-2 (SCSI-2) ANSI X3.131-1994 Specification. The iSCSI protocol that may be utilized in system 100 may be compatible with the protocol described in IETF RFC 3720, published April 2004, and/or other and/or later-developed versions of this protocol. Of course, many different communication protocols may be used for such data and/or command exchange without departing from this embodiment.

System 100 also may comprise one or more communication links 70 that may communicatively couple one or more networks 160 to operative circuitry 118 such that circuitry 118 may be capable of receiving one or more network data streams 72 via one or more links 70. One or more links 70 may comply or be compatible with one or more communication protocols with which one or more links 50 may comply or be compatible. Alternatively or additionally, one or more links 70 may comply with other and/or additional communication protocols.

Figure 2:
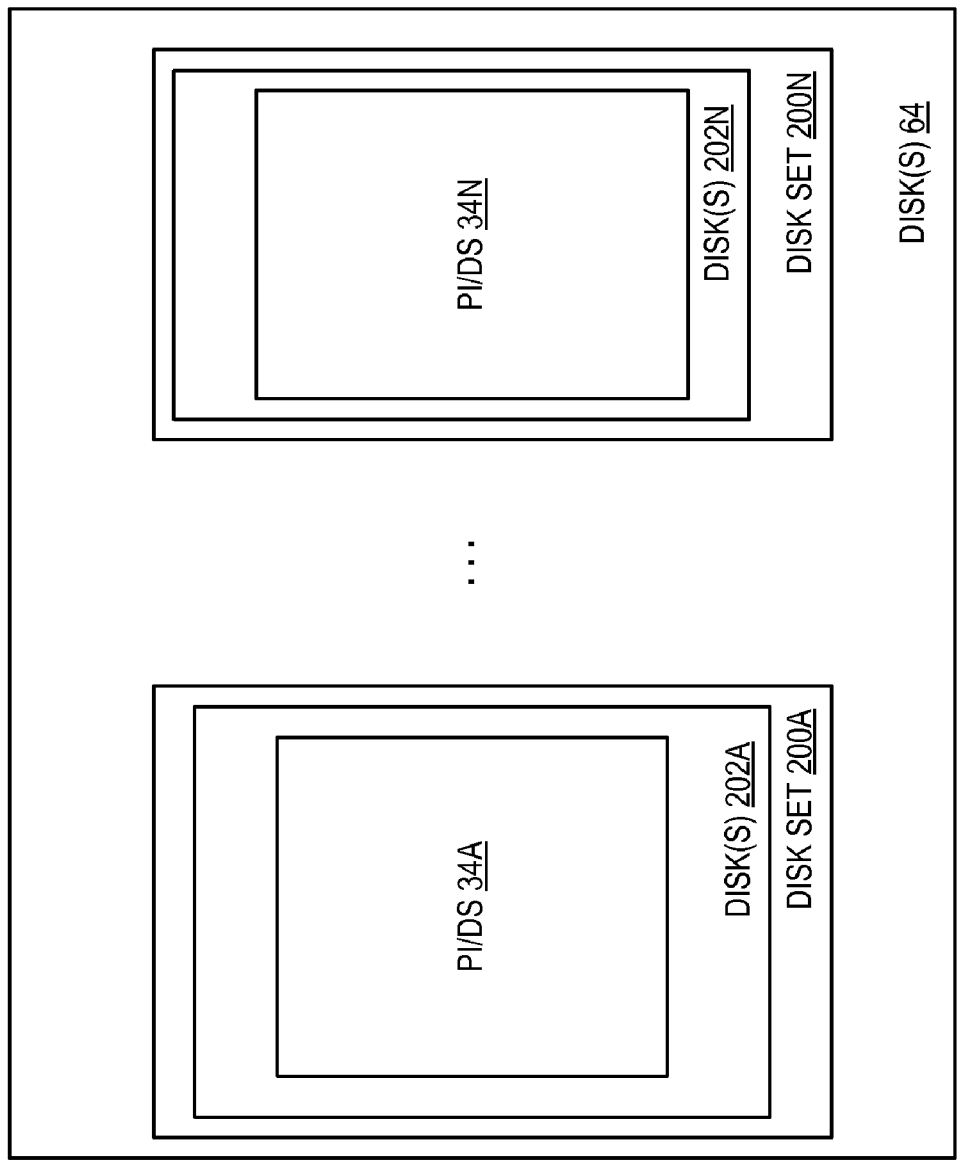
FIG. 2 illustrates features of a variation of the embodiment shown in FIG. 1.

With reference now being made to FIGS. 1 to 3, operations 300 that may be performed in system 100 will be described. After, for example, a reset of system 100, as a result, at least in part, of a request issued by the human user (not shown) to host system 10 via the not shown user interface system, controller 120 and/or processor 12 may signal circuitry 118. This may result in circuitry 118 generating, at least in part, at least one access request 52 that may involve RAID storage 28, as illustrated by operation 302 in FIG. 3. For example, in this embodiment, at least one request 52 may request accessing of one or more blocks of data (e.g., data 55). As used in this embodiment, a "block" of data may comprise one or more portions of data, such as, for example, one or more fixed and/or pre-defined length segments and/or units of data. Circuitry 118 may issue, at least in part, at least one packet 54 to RAID storage 28 via one or more links 50. One or more packets 54 may comprise, at least in part, one or more requests 52. As used in this embodiment, a "packet" may comprise one or more symbols and/or values. Also as used in this embodiment, "accessing" data may comprise one or more operations that involve and/or manipulate data, such as, for example, reading and/or writing data.

After circuitry 118 has issued, at least in part, at least one packet 54 to circuitry 118' via one or more links 50, circuitry 118' may receive, at least in part, at least one packet 54. This may result, at least in part, in circuitry 118' receiving, at least in part, at least one request 52, as illustrated by operation 304 in FIG. 3. In response, at least in part, to at least one request 52, circuitry 118' may access, in accordance at least in part with the at least one request 52, an encryption and/or parity information (PI) associated with the data 55 in storage 28. In this embodiment, this encryption may comprise an encryption of at least one portion of the data 55 and/or PI associated with the data 55. This PI may be generated based at least in part upon the data 55, and may be used to re-generate and/or reconstruct, at least in part, the data 55, based at least in part upon RAID PI generation and/or data recovery techniques. PI may be generated, at least in part, using and/or in accordance, at least in part, with one or more of the following: one or more XOR calculations, one or more Reed-Solomon techniques, and/or other and/or additional syndrome calculation techniques. This encryption may be stored in encrypted disk stripes in storage 28 such that the data 55 may be unrecoverable based solely upon a remaining unencrypted portion of the data 55 and the PI stored in storage 28. Alternatively or additionally, this encryption may be stored in one or more respective disk stripes. The number of the disk stripes may be determined based at least in part upon one or more encryption levels, if any, associated with one or more characteristics of the data 55.

For example, in this embodiment, if at least one request 52 requests, at least in part, that data 55 be written into storage 28, then in response, at least in part, to at least one request 52, circuitry 118' may generate, based at least in part upon data 55 and in accordance at least in part with the particular RAID level implemented in RAID 28, one or more respective disk stripes 30A ... 30N of encryption 85, one or more respective unencrypted disk stripes 32A ... 32N, and one or more PI disk stripes 34A ... 34N. Alternatively, circuitry 118 in host 10 may generate, at least in part, the encrypted disk stripes and/or PI, and may communicate them (e.g., as part of one or more requests 52), at least in part, to circuitry 118' in RAID 28. Circuitry 118' may store one or more disk stripes 30A ... 30N in one or more respective disks 60 in RAID 28; circuitry 118' may store one or more disk stripes 32A ... 32N in one or more respective disks 62 in RAID 28; and circuitry 118' may store one or more PI disk stripes 34A ... 34N in one or more respective disks 64 in RAID 28. The number of the one or more encrypted disk stripes 30A ... 30N in encryption 85 may be selected such that, depending upon and/or as result, at least in part, of the particular RAID level implemented in RAID 28, the one or more encrypted disk stripes 30A ... 30N (and, therefore, also data block 55) cannot be recovered (e.g., cannot be reconstructed and/or regenerated) based solely upon (e.g., using) conventional RAID techniques, the remaining one or more unencrypted disk stripes 32A ... 32N, and the one or more PI disk stripes 34A ... 34N. In order for this condition to satisfied, the number of encrypted stripes 30A ... 30N (and, therefore, also the number of respective disks 60 in which stripes 30A ... 30N may be stored) is at least greater by 1 (i.e., unity) than the maximum number of data stripes that can be recovered using only conventional RAID techniques, the remaining one or more unencrypted disk stripes 32A ... 32N, and the one or more PI disk stripes 34A ... 34N. For example, if RAID 28 implements a single exclusive-OR (XOR) syndrome, then the number of encrypted disk stripes 30A ... 30N (and respective disks comprised in disks 60) may be greater than or equal to two. Alternatively, if RAID 28 implements a double XOR syndrome (and/or other and/or additional RAID technique whereby two disks in RAID 28 may be recovered in event of failure of the two disks) then the number of encrypted disk stripes 30A ... 30N (and respective disks comprised in disks 60) may be greater than or equal to three. In order to enhance security, depending upon the RAID level implemented in RAID 28, the first stripe and/or every alternating stripe (and/or any combination of stripes, for example, determined, at least in part, by a human user) comprised in the total number of data (e.g., non-PI) stripes generated based at least in part upon data 55 may be encrypted and comprised in encryption 85.

In this arrangement, one or more PI stripes 34A ... 34N may be unencrypted, and may be stored in one or more disks 64 in a rotating fashion (e.g., in accordance, at least in part, with a modulo calculation based at least in part upon the total number of disks in RAID 28 in which unencrypted data and/or PI are stored) so as to disburse as evenly as practicable among one or more disks 64 the total number of PI stripes within the one or more disks 64. One or more disks 64 may only store unencrypted data and/or unencrypted PI. Thus, one or more disks 64 may be different from one or more disks 60. Conversely, however, one or more disks 62 may (but are not required to) comprise one or more disks 64. Advantageously, this may increase the speed with which a write operation in RAID 28 may be carried out, especially if that operation involves modification of one of the data stripes 30A ... 30N and/or 32A ... 32N previously stored in RAID 28, since the reading of old PI associated with the data stripe to be modified (e.g., for use in generating new PI that reflects the modified data stripe) may not involve decrypting the old PI or encrypting the new PI. Thus, for example, if the write operation involves modifying stripe 32A, the one or more (old) PI stripes 34A ... 34N may be read without having to be decrypted, and after the one or more new PI stripes are calculated based at least in part upon the modified stripe 32A, the new one or more PI stripes may be written to one or more disks 64 in such a way as to replace (e.g., overwrite) one or more PI stripes 34A ... 34N without having to encrypt the one or more new PI stripes.

Additionally, in this arrangement, if one or more requests 52 request, at least in part, a read operation involving one or more of the one or more unencrypted data stripes 32A ... 32N (and/or depending upon the implementation, additionally and/or alternatively one or more stripes 34A ... 34N), the read operation may be performed without having to decrypt the one or more data stripes 32A ... 32N (and/or depending upon the implementation one or more stripes 34A ... 34N) being read. Advantageously, this may improve the speed with which such a read operation may be performed compared to what might be the case if all of the data stripes (including stripes 32A ... 32N) in RAID 28 were encrypted.

By way of example, in this arrangement, the total number of disks comprised in disks 60, 62, and 64 may be equal to eight, and the RAID 28 may implement a single XOR syndrome. In this example, the number of stripes comprised in one or more encrypted disk stripes 30A ... 30N (and therefore also the number of disks comprised in one or more disks 60) may be equal to two, and the total number of stripes comprised in one or more unencrypted disk stripes 32A ... 32N and one or more PI stripes 34A ... 34N (and therefore also the total number of disks comprised in disks 62 and 64) may be equal to six. Also in this example, data 55 may be comprised in data stripes 30A ... 30N and 32A ... 32N, and a single PI stripe (e.g., stripe 34A) comprised in one or more stripes 34A ... 34N. The disk in which the PI stripe may be located may be calculated by circuitry 118' based at least in part upon the data stripes.

Additionally or alternatively, the number of one or more encrypted disk stripes 30A ... 30N in encryption 85 may be determined, at least in part, based at least in part upon one or more encryption levels, if any, that may be associated with one or more characteristics of data 55. In this arrangement, one or more instructions 57, one or more descriptors 59, and/or LUT 82 may be generated, at least in part, and/or stored, at least in part, by circuitry 118, controller 120, and/or one or more processors 12 in memory 122 (and/or memory 21) based at least in part upon one more user-defined and/or pre-defined preferences that may associate, at least in part, one or more characteristics of the data 55 with one or more encryption levels that may be indicated, at least in part, by one or more instructions 57 and/or one or more descriptors 59, and these associations may be reflected, embodied, and/or indicated, at least in part, in LUT 82. These one or more characteristics may comprise, for example, whether the data 55 is from a secure channel (e.g., one or more links 70 may be or comprise one or more secure (e.g., encrypted) channels), whether one or more respective file types comprises, at least in part, the data 55, whether the data 55 is from, at least in part, a respective network stream (e.g., network stream 72), and/or whether the data 55 satisfies, at least in part, one or more (e.g., other and/or additional) user-defined and/or pre-defined criteria. These one or more characteristics may be associated, at least in part, with one or more encryption levels to be used in connection with data 55. For example, these one or more characteristics may be associated, at least in part, with one or more respective encryption levels. These one or more encryption levels may be associated with, specify, and/or indicate, at least in part, numbers of encrypted stripes to be used in storing, at least in part, data 55 in RAID 28, and/or with types of encryption methodologies to be used in generating, at least in part, encrypted stripes 30A ... 30N. LUT 82 may associate, at least in part, these one or more characteristics with one or more instructions 57 and/or one or more descriptors 59 that may indicate (and/or implement) the one or more encryption levels associated, at least in part, with these one or more characteristics, and/or with the one or more encryption levels themselves.

In this arrangement, controller 120, circuitry 118, and/or one or more processors 12 may generate, at least in part, one or more requests 52 based, at least in part upon the associations and/or one or more encryption levels associated, at least in part, with (and/or as indicated, at least in part, in LUT 82, one or more instructions 57, and/or one or more descriptors 59) the one or more characteristics of the data 55. In response, at least in part, to one or more requests 52, circuitry 118' may access the encryption 85 and/or PI 34A ... 34N in accordance with the one or more requests 52. For example, controller 120, circuitry 118, and/or one or more processors 12 may determine, at least in part, based at least in part upon the information in LUT 82, one or more instructions 57, and/or one or more descriptors 59, one or more encryption levels associated, at least in part, with one or more characteristics of data 55. If the access involves a write operation, controller 120, circuitry 118, and/or one or more processors 12 may generate, at least in part, one or more encrypted data stripes 30A ... 30N, one or more unencrypted data stripes 32A ... 32N, and/or one or more parity stripes 34A ... 34N, based upon data 55 and the RAID level implemented in RAID 28, in accordance with these one or more encryption levels associated, at least in part, with the data 55 (e.g., such that the number of stripes 30A ... 30N is equal to the disk stripe number associated with the one or more encryption levels and/or the encryption 85 reflects, at least in part, the one or more encryption methodologies associated, at least in part, with the one or more encryption levels). Controller 120, circuitry 118, and/or one or more processors 12 may then generate, at least in part, and issue, at least in part, to circuitry 118' one or more requests 52 that may request, at least in part, that these one or more encrypted disk stripes 30A ... 30N, one or more unencrypted disk stripes 32A ... 32N, and one or more parity stripes 34A ... 34N be written, at least in part, into one or more disks 60, one or more disks 62, and one or more disks 64, respectively. In response, at least in part, to one or more requests 52, circuitry 118' may write these one or more encrypted disk stripes 30A ... 30N, one or more unencrypted disk stripes 32A ... 32N, and one or more parity stripes 34A ... 34N be written, at least in part, into one or more disks 60, one or more disks 62, and one or more disks 64, respectively, in the manner requested by one or more requests 52. Alternatively, circuitry 118' may generate, at least in part, the encryption 85 and/or one or more PI stripes 34A ... 34N based, at least in part, upon the unencrypted versions of the one or more disk stripes 30A ... 30N, and the one or more unencrypted disk stripes 32A ... 32N (e.g., issued to circuitry 118' in one or more requests 52).

In this arrangement, it is possible that the one or more encryption levels associated, at least in part, with the data 55 may indicate, at least in part, that the data 55 is not to be encrypted. In this case, encryption 85 essentially may be eliminated and stripes 30A ... 30N may comprise unencrypted data stripes of data 55. Also in this arrangement, if no encryption level is associated with the one or more characteristics of data 55, the data 55, as stored in RAID 28, may be unencrypted. In this case, as in the previous case, encryption 85 essentially may be eliminated and stripes 30A ... 30N may comprise unencrypted data stripes of data 55. Moreover, in this arrangement, the one or more instructions 57 and/or one or more descriptors 59 may include, at least in part, one or more reserved fields to specify and/or indicate, at least in part, the one or more encryption levels associated with the data 55; this may enhance compatibility with legacy RAID systems and/or software.

Thus, for example, in this arrangement, the one or more encryption levels that may be associated with, at least in part, the one or more characteristics of the data 55 may indicate, at least in part, that one or more data stripes 30A ... 30N are to comprise a relatively lower level of encryption (and commensurately, security), by comprising only a single encrypted data stripe (e.g., stripe 30A). Alternatively, depending on the one or more characteristics of the data 55 and/or the one or more encryption levels associated with them, one or more data stripes 30A ... 30N may comprise a relatively higher level of encryption (and commensurately, security), by comprising a plurality (two, three, or more) encrypted data stripes. Additionally, the one or more encryption levels that may be associated with the one or more characteristics of the data 55, as well as, the one or more characteristics themselves may be modified, for example, by a human user via the not shown user interface. Advantageously, in this embodiment, the particular nature, characteristics, sensitivity and/or importance of data 55 may be used as criteria for selecting the encryption level (and also therefore, the security) of the data 55; this may increase the utility of this embodiment compared to the prior art. Also advantageously, the above features of this embodiment may permit the human user to select the balance that is to be struck between data security and RAID performance. As a further security enhancement, one or more encryption levels that may be associated with the one or more characteristics of data 55 may indicate, at least in part, that one or more PI stripes 34A ... 34N may be encrypted (and may be comprised in encryption 85). Advantageously, this may permit both the entirety of the data 55 (or only a portion thereof) and the entirety of the PI associated with the data 55 (or only a portion thereof) to be encrypted in RAID 28 depending upon these one or more encryption levels. Thus, in this arrangement, depending upon these one or more encryption levels, both one or more PI stripes 34A ... 34N and all of the data stripes 30A ... 30N and 32A ... 32N may be encrypted and comprised in encryption 85.

In a variation of this embodiment (see FIG. 2), PI stripes 34A ... 34N may comprise respective copies of PI. For example, in the variation shown in FIG. 2, one or more disks 64 may comprise a plurality of disk sets 200A ... 200N that each may include one or more respective disks 202A ... 202N. A first disk set 200A and a second disk set 200N in the plurality of disk sets 200A ... 200N may be mutually disjoint from each other, and may comprise one or more disks 202A and one or more disks 202N, respectively. One or more disks 202A may include a respective disk that may store a respective PI stripe 34A that may have been generated, at least in part, based at least in part upon data 55, and data 55 may be capable of being reconstructed, at least in part, based at least in part upon the PI stripe 34A. One or more disks 202N may include a single respective disk that may store a respective PI stripe 34N. PI stripe 34N may be a copy of PI stripe 34A.

In this variation, the respective copies 34A and 34N of PI may be stored in respective corresponding physical and/or logical address spaces and/or ranges of disks 202A and 202N, respectively. That is, the respective address space and/or range in which PI stripe 34A may be stored in disk 202A may be numerically the same as the respective address space and/or range in which PI stripe 34N may be stored in disk 202N. Additionally in this variation, the first set of disks 200A may comprise a plurality of disks (e.g., that may be comprised in whole or in part in, for example, one or more disks 62 and/or 60) that may store both data segments (e.g., data stripes) and PI segments (e.g., PI stripes) associated with the data segments. One or more disks 202N may store only respective copies of the PI segments (e.g., respective copies of the PI stripes stored in disk set 200A), but may not store any data segments (e.g., may not store any data stripes). In this variation, RAID 28 may implement a RAID level greater than three.

In this variation, in response, at least in part, to one or more requests 52 (generated, at least in part by circuitry 118, controller 120, and/or at least one processor 12), circuitry 118' may access the encryption 85 and/or PI 34A ... 34N in accordance with the one or more requests 52. For example, if the access involves a write operation and none of the stripes of data 55 have previously been written into RAID 28, controller 120, circuitry 118, and/or one or more processors 12 may generate, at least in part, one or more encrypted data stripes 30A ... 30N, one or more unencrypted data stripes 32A ... 32N, and/or parity stripes 34A ... 34N, based upon data 55 and the RAID level implemented in RAID 28, in accordance with the foregoing features of this variation. Controller 120, circuitry 118, and/or one or more processors 12 may then generate, at least in part, and issue, at least in part, to circuitry 118' one or more requests 52 that may request, at least in part, that these one or more encrypted disk stripes 30A ... 30N, one or more unencrypted disk stripes 32A ... 32N, and parity stripes 34A ... 34N be written, at least in part, into one or more disks 60, one or more disks 62, and disks 64, respectively. In response, at least in part, to one or more requests 52, circuitry 118' may write these one or more encrypted disk stripes 30A ... 30N, one or more unencrypted disk stripes 32A ... 32N, and parity stripes 34A ... 34N be written, at least in part, into one or more disks 60, one or more disks 62, and disks 64, respectively, in the manner requested by one or more requests 52, such that these stripes have the foregoing features of this variation. Alternatively, circuitry 118' may generate, at least in part, the encryption 85 and/or PI stripes 34A ... 34N based, at least in part, upon the unencrypted versions of the one or more disk stripes 30A ... 30N, and the one or more unencrypted disk stripes 32A ... 32N (e.g., issued to circuitry 118' in one or more requests 52) in such a way as to implement the foregoing features of this variation.

Conversely, in this variation, if the access involves a write operation in which at least a portion of the data 55 has already been previously written into RAID 28 and one or more data stripes (e.g., stripe 32A) are to be overwritten with a new data stripe, circuitry 118 may generate, at least in part, and issue, at least in part, to circuitry 118' one or more requests 52 that may request, at least in part, that these one or more data stripes 32A and parity stripes 34A ... 34N be written, at least in part, into one or more disks 62 and disks 64, respectively. In response, at least in part, to one or more requests 52, circuitry 118' may write these one or more disk stripes 32A and parity stripes 34A ... 34N into one or more disks 62 and disks 64, respectively, in the manner requested by one or more requests 52, such that these stripes have the foregoing features of this variation. For example, circuitry 118' may read (and decrypt as necessary) one or more stripes 30A ... 30N, one or more stripes 32A ... 32N (except the new stripe being written), and one of the two PI stripes 34A ... 34N (e.g., stripe 34N), and may generate, at least in part, a new PI stripe based at least in part upon the thus read stripes and the new data stripe to be written into RAID 28. That is, with respect to this reading of the one of the two PI stripes 34A, 34N, circuitry 118' may select one of the disks 202A, 202N from which to read the one of the two respective copies of the PI stripes 34A, 34N based at least in part upon whether disk 202A or 202N is being presently accessed, e.g., as a result, at least in part, of another access request. For example, if disk 202A that stores PI stripe 34A is currently being accessed as result at least in part of another access request, circuitry 118' may access (e.g., read) the other copy 34N of this PI stripe 34A that is stored in disk 202N, or vice versa, depending upon which of the two disks 202A, 202N is currently being accessed as a result of this other request. After determining the new PI, circuitry 118' may write this new PI into both PI stripes 34A and 34N (e.g., the current PI stored in stripes 34A and 34N may be overwritten with this new PI).

Thus, in this variation, at least one disk is provided to store only a copy of PI, and another copy of that PI is stored in one or more disks in which data stripes are also stored. Advantageously, this may reduce conflict/contention issues, and may improve efficiency and performance of the RAID 28 in this variation, compared to the prior art.

Thus, in an embodiment, an apparatus is provided that may include circuitry to generate, at least in part, and/or receive, at least in part, at least one access request involving a redundant array of independent disks (RAID) storage. The storage may be capable of accessing, in response, at least in part, to the at least one request an encryption and/or PI. The encryption may be of at least one portion of the data and/or the PI. The encryption may be stored in (1) encrypted disk stripes in the storage such that the data is unrecoverable based solely upon remaining unencrypted portion of the data and the PI stored in the storage, and/or (2) one or more respective disk stripes having a number that is determined based at least in part upon one or more encryption levels, if any, associated with at least one characteristic of the data.

In a variation of this embodiment, the circuitry may be capable of generating, at least in part, and/or receiving at least in part, at least one request to access data in the RAID storage. The storage may store a first copy of PI and a second copy of the PI. The data may be capable of being reconstructed, at least in part, based at least in part upon the PI. The first copy may be stored in a first disk of a first disk set and the second copy may be stored in a second disk of a second disk set. The first set may be disjoint from the second set. The storage, in response at least in part to the at least one request, may read either the first copy or the second copy based at least in part upon whether the first disk is being accessed as a result, at least in part, of another request.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The invention claimed is:

1. An apparatus comprising:
   circuitry to at least one of the following sub-paragraphs (a) and (b):
   (a) generate, at least in part, at least one access request involving a redundant array of independent disks (RAID) storage, the storage being capable of accessing, in response, at least in part, to the at least one request at least one of an encryption and parity information, the encryption being of at least one of at least one portion of the data and the parity information, the encryption satisfying at least one of the following subparagraphs (c) and (d):
      (c) the encryption is stored in encrypted disk stripes in the storage such that the data is unrecoverable based solely upon remaining unencrypted portion of the data and the parity information stored in the storage;
      (d) the encryption is stored in one or more respective disk stripes having a number that is determined based at least in part upon one or more encryption levels, if any, associated with one or more characteristics of the data; and
   (b) receive, at least in part, the at least one request;
   wherein:
      the encryption satisfies the subparagraph (c);
      the storage implements a syndrome wherein two disks may be recovered;
      the encrypted disk stripes comprise at least three respective stripes respectively stored in at least three respective disks in the storage; and
      the parity information, as stored in the storage, is unencrypted, and striped in other disks in the storage that are different from the at least three respective disks.

2. The apparatus of claim 1, wherein:
   if no encryption level is associated the one or more characteristics, the data, as stored in the storage, is unencrypted.

3. The apparatus of claim 1, wherein:
   the one or more characteristics comprise at least one of the following: whether the data is from, at least in part, a secure channel, whether the data is from a respective network stream, whether a respective file type comprises, at least in part, the data, and whether the data satisfies one or more user-defined criteria; and
   the one or more encryption levels are indicated at least in part by at least one of: at least one instruction and at least one RAID descriptor.

4. The apparatus of claim 3, wherein:
   the encryption comprises both the data and the parity information.

5. The apparatus of claim 1, wherein:
   a circuit card comprises, at least in part, the circuitry.

6. Computer-readable memory storing one or more instructions that when executed by a machine result in execution of operations comprising:
   at least one of the following sub-paragraphs (a) and (b):
      (a) generating, at least in part, by circuitry at least one access request involving a redundant array of independent disks (RAID) storage, the storage being capable of accessing, in response, at least in part, to the at least one request at least one of an encryption and parity information, the encryption being of at least one of at least one portion of the data and the parity information, the encryption satisfying at least one of the following subparagraphs (c) and (d):
         (c) the encryption is stored in encrypted disk stripes in the storage such that the data is unrecoverable based solely upon remaining unencrypted portion of the data and the parity information stored in the storage;
         (d) the encryption is stored in one or more respective disk stripes having a number that is determined based at least in part upon one or more encryption levels, if any, associated with one or more characteristics of the data; and
      (b) receive, at least in part, by the circuitry the at least one request;
   wherein:
      the encryption satisfies the subparagraph (c);
      the storage implements a syndrome wherein two disks may be recovered;
      the encrypted disk stripes comprise at least three respective stripes respectively stored in at least three respective disks in the storage; and
      the parity information, as stored in the storage, is unencrypted, and striped in other disks in the storage that are different from the at least three respective disks.

7. The memory of claim 6, wherein:
   if no encryption level is associated the one or more characteristics, the data, as stored in the storage, is unencrypted.

8. The memory of claim 6, wherein:
   the one or more characteristics comprise at least one of the following: whether the data is from, at least in part, a secure channel, whether the data is from a respective network stream, whether a respective file type comprises, at least in part, the data, and whether the data satisfies one or more user-defined criteria; and
   the one or more encryption levels are indicated at least in part by at least one of: at least one instruction and at least one RAID descriptor.

9. The memory of claim 8, wherein:
   the encryption comprises both the data and the parity information.

10. The memory of claim 6, wherein:
    a circuit card comprises, at least in part, the circuitry.

* * * * *